Jan. 5, 1926.

C. H. KRONEWITTER

AUTOMOBILE SIGNAL SWITCH

Filed Nov. 23, 1922

INVENTOR.
C. H. Kronewitter
BY
George J. Oltsch
ATTORNEY.

Patented Jan. 5, 1926.

1,568,744

UNITED STATES PATENT OFFICE.

CARL H. KRONEWITTER, OF MISHAWAKA, INDIANA.

AUTOMOBILE SIGNAL SWITCH.

Application filed November 23, 1922. Serial No. 602,853.

*To all whom it may concern:*

Be it known that I, CARL H. KRONEWITTER, a citizen of the United States, residing at Mishawaka, in the county of St. Joseph and State of Indiana, have invented certain new and useful Improvements in Automobile Signal Switches, of which the following is a specification.

The invention relates to automobile signal switches, and has for its object to provide a device of this character comprising a bracket carried by the steering post of the automobile and provided with double switches controllable by buttons, which switches control signalling lights. Brackets carried by adjacent spokes of the steering wheel, and in the path of one of the buttons of each of the double switches, and adapted to engage and depress one of the buttons of the double switches upon the rotation of the steering wheel for breaking the circuit after a signaling operation.

A further object is to provide pivoted levers carried by the switch supporting bracket, one end of which levers engage and depress one of the buttons of the double switches for raising the other buttons and closing the circuit, the other ends of said levers terminating adjacent the steering wheel rim where they may be easily rocked on their pivotal points by a finger of the operator without removing the hands from the rim.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
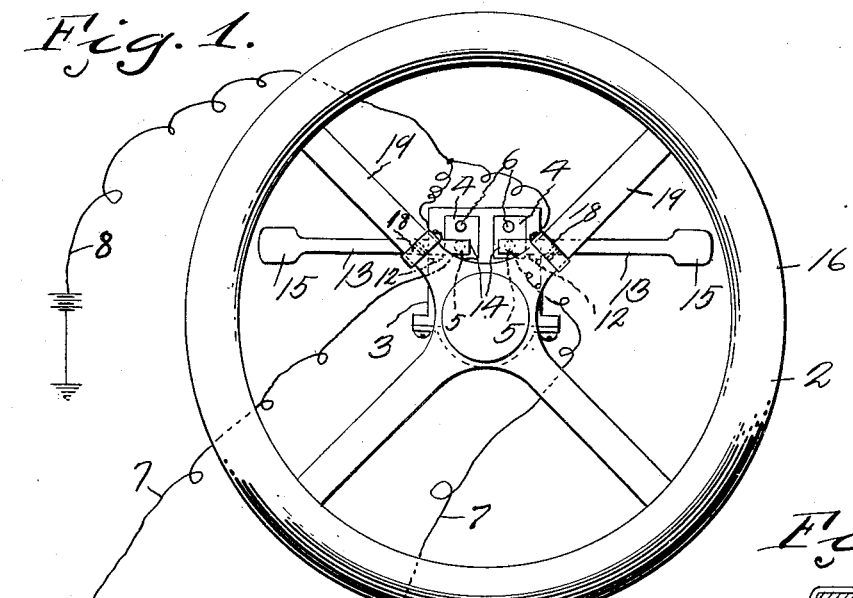
Figure 1 is a top plan view of a steering wheel, showing the device applied thereto.
Figure 4:
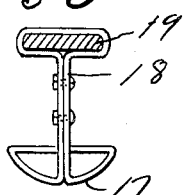
Figure 4 is a sectional view through one of the steering wheel spokes, showing one of the button depressing members carried thereby.
Figure 2:
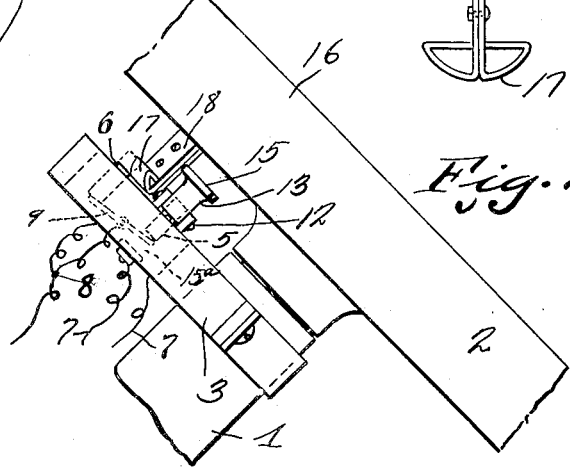
Figure 2 is an enlarged side elevation of a portion of the steering wheel and steering column showing the device applied thereto.
Figure 3:
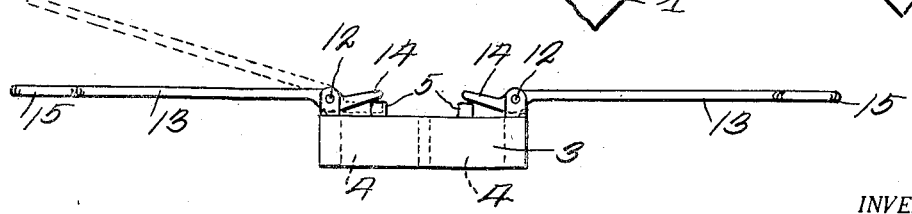
Figure 3 is a front elevation of the steering column carried bracket.

Referring to the drawing, the numeral 1 designates the steering column of a conventional form of automobile and 2 the steering wheel. The steering column 1 is stationary and has secured thereto a bracket 3 adjacent its upper end. The bracket 3 is provided with spaced double switches 4 of a conventional form, which switches are provided with depression buttons 5 and 6; the buttons 5 when depressed close circuits 7 and 8, by rocking members 9. The buttons 6 when depressed engage the members 9 and break the circuits 7 and 8, thereby turning out the lights or lamps 10 in the signalling box 11. Pivotally mounted at 12 on the bracket 3 are levers 13, the inner ends 14 of which overlie the buttons 5 and when forced downwardly by an upward movement on the outer ends 15 of the levers 13, closes the contact at 15ª thereby closing the circuits 7 and 8 according to the desire to signal to an approaching vehicle that the operator contemplates a turn to the right or left. The outer ends of the levers 13 terminate adjacent the steering wheel rim 16 where the operator can easily place his finger in engagement therewith and force the same upwardly without removing his hands from the rim of the steering wheel, and consequently obviate the necessity of removing his eyes from the roadway for manipulating the switch. It will be seen that the circuits are manually made.

After the operator has manually actuated the proper button 5 for signalling a right or left turn, the operator then rotates the steering wheel 2 for making the contemplated turn. As the steering wheel 2 is rotated, the arcuated shaped ends 17 of brackets 18, which are adjustably mounted on the spokes 19 of the wheel, and in the path of the buttons 6, move to a position where one or the other of the arcute ends 17 will engage the raised button 6, and depress the same, thereby breaking the circuit which has been previously made and consequently putting out the lamp 10 which has been lighted. The circuit shown is a conventional one and it is to be understood that the circuit may be of any character or the switches 4 of any construction wherein the depression of one button for making a circuit will raise the other button, and a depression of the other button will break the circuit.

From the above it will be seen that an automobile signalling device is provided of a double switch type, which device is controllable by the fingers of the operator without removing the hands from the steering wheel rim, and that the circuits after having been made will be automatically broken upon a rotation of the steering wheel when the operator makes the contemplated turn.

The invention having been set forth what is claimed as new and useful is:—

The combination with an automobile steering column, a steering wheel mounted on the column and having radially disposed spokes, a casing mounted on the steering column below and adjacent the steering wheel, a circuit maker and breaker carried by the casing and comprising double push button switches having their circuit making buttons arcuately disposed in relation to the center of the steering wheel, the circuit breaking buttons being arcuately disposed in relation to the center of the steering wheel, pivoted manually operated levers carried by the casing and extending under the wheel, said circuit making buttons being disposed adjacent the steering column, of downwardly extending brackets carried by the spokes of the wheel in the path of the circuit breaking buttons and movable angularly across the manually operated levers, thereby allowing a complete rotation of the wheel.

In testimony whereof I affix my signature.

CARL H. KRONEWITTER.